United States Patent [19]

Mullins

[11] 4,312,095
[45] Jan. 26, 1982

[54] MOBILE LAWN RAKE ATTACHMENT

[76] Inventor: Harvey L. Mullins, 9610 La-Jolla Dr., Olivette, Mo. 63132

[21] Appl. No.: 156,395

[22] Filed: Jun. 4, 1980

[51] Int. Cl.³ .............................................. A01D 7/02
[52] U.S. Cl. ..................................... 56/400.14; 15/78; 15/79 A; 56/400.16; 56/400.17
[58] Field of Search ................ 56/400.14, 400.13, 384, 56/393, 400.18, 400.19, 400.2, 400.17, 400.15, 386, 387, 394, 396, 397, 398; 15/78, 79, 79 A

[56] References Cited

U.S. PATENT DOCUMENTS

| | | | |
|---|---|---|---|
| 87,267 | 2/1869 | Knight | 56/394 |
| 356,351 | 1/1887 | Crist | 56/384 |
| 635,751 | 10/1899 | Dennis | 56/384 |
| 895,847 | 8/1908 | Ditchfield | 56/400.16 |
| 1,303,899 | 5/1919 | Hodgson | 56/394 |
| 1,794,922 | 3/1931 | Ravens | 56/384 |
| 1,841,467 | 1/1932 | Draper | 56/384 |
| 2,008,073 | 7/1935 | Huntley | 56/400.19 |
| 2,475,862 | 7/1949 | Tomkins | 56/400.17 |
| 2,511,642 | 6/1950 | Law | 56/400.14 |
| 2,645,891 | 7/1953 | Berkliey | 56/386 |
| 2,648,946 | 8/1953 | Kelly | 56/385 |
| 2,652,279 | 9/1953 | Morris | 56/400.18 |
| 2,847,816 | 8/1958 | Yeda | 56/400.17 |
| 3,438,183 | 4/1969 | Puretic | 56/378 |
| 4,057,953 | 11/1977 | Rugg | 56/400.17 |

Primary Examiner—Paul J. Hirsch
Attorney, Agent, or Firm—Haverstock, Garrett & Roberts

[57] ABSTRACT

A mobile lawn rake attachment advantageous for use in conjunction with conventional riding mowers or other similar towing vehicles for providing a convenient method of raking large areas of accumulated grass clippings, leaves, and other associated lawn debris and effectively reducing the overall time required for such raking operations including a wheel frame assembly having a forwardly extending portion thereon for coupling to a conventional towing vehicle, a rake tine assembly mounted for pivotal movement on a tine carrying cross-bar member positioned above the wheel frame assembly and having three substantially identical overlapping tine sections which may be constructed in varying arrangements relative to each other including having the center tine section disposed aft of the two end tine sections positioned adjacent thereto, and a relatively simple linkage mechanism readily accessible from the seat of the towing vehicle for pivotally raising and lowering the rake tine assembly between a ground engaging operative raking position and an elevated position angularly related thereto for delivering and dumping the accumulated debris gathered and retained therein. The present device may also include optional tine sections which may be easily and conveniently attached to the outermost tine portions of certain embodiments of the rake assembly for more efficiently gathering and retaining associated lawn debris within the rake assembly and may likewise include a plurality of substantially identical overlapping tine sections adaptable to form rake assemblies of variable widths.

4 Claims, 6 Drawing Figures

MOBILE LAWN RAKE ATTACHMENT

BACKGROUND OF THE INVENTION

This invention relates to a mobile lawn rake attachment fashioned for use with conventional riding lawn mowers or other suitable towing vehicles and, more particularly, to a rake attachment including a wheel frame support assembly, a rake tine assembly mounted for pivotal movement and having three substantially identical tine subassemblies adaptable to overlap each other at each end portion thereof wherein said three tine subassemblies may be constructed in varying arrangements relative to each other including having the center tine subassembly disposed aft of the two remaining tine subassemblies located on each adjacent side thereof in a trailing position thereto, and operator actuated means readily accessible from the seat of the towing vehicle for pivotally operating the rake tine assembly between an active raking position and an elevated dumping position.

It is well known that a great majority of individuals including homeowners, commercial establishments, and a wide variety of other institutional entities utilize motorized lawn mowers, garden tractors, and other suitable vehicles for easily and conveniently mowing the grass associated with both residential and commercial properties. The advantages associated with the use of such motorized lawn equipment and other home and agricultural implements relate primarily to a faster and more efficient means of performing and accomplishing the required task, be it mowing the grass or performing other associated lawn maintenance tasks, thereby decreasing the overall time involved in such as operation while, at the same time, requiring only a minimum expenditure of manual labor. With the advent of today's leisure society, motorized lawn equipment and related implements are becoming more and more popular than ever before.

Generally, the use of riding mowers and the like are associated with cutting and maintaining relatively large areas of grass and other foliage. Being fully motorized and self-propelled, leisure oriented users can cut and maintain large areas of grass and other ground covering foliage in a relatively short period of time and with little effort and fatigue. This is important to homeowners and other users, especially in today's fast moving society, where ever-increasing demands upon an individual's time leave little or no leisure time available for an individual's own relaxation, recreation, personal enjoyment and pleasure. Equally important to the users of such motorized lawn equipment is a relatively fast and efficient means for accomplishing the difficult task of gathering and removing the cut lawn clippings and other accumulated debris associated with proper lawn care maintenance. Because a great majority of grass and other foliage areas which are normally maintained by using the powered means of a riding mower or other similar vehicle are relatively large in acreage, hand raking becomes almost impossible, at least within a reasonable amount of time, even though hand raking is often times the only available means of accomplishing the raking task. Therefore, it is highly desirable to provide a simple, quick, and efficient means for both gathering and removing lawn clippings, accumulated leaves and the like so as to more effectively reduce the overall time required during a raking process, especially where the raking of a relatively large area is involved, thereby enabling additional activities, including increased leisure time.

Many different types of lawn rake assemblies and various types of mechanical sweepers are available and have been employed for use in raking a lawn or other area after a mowing operation in order to more effectively and efficiently accomplish the raking process and reduce the overall time associated therewith. The known prior art constructions for the most part are characterized by complicated and cumbersome mechanisms which include both conventional linkage and hydraulically actuated systems utilized for raising and lowering the rake tine assembly in its entirety. For example, the McCleskey U.S. Pat. No. 2,475,908 is designed to be connected to a tractor or other suitable vehicle having means associated therewith by which the rake can be readily lifted from an active ground contact position for the purpose of delivering materials accumulated thereby. The lifting mechanism employed to raise and lower the tines of the rake consist of a complicated mechanical linkage assembly which is substantially different from the present construction.

Berkley U.S. Pat. No. 2,645,891 discloses a power rake assembly which utilizes a hydraulically operated power system to actuate two identical extensible linkage mechanisms for pivotally operating the tine assembly. The disclosure of this patent relates primarily to a fluid actuated power means for raising and lowering the tine assembly in its entirety and as such is likewise substantially different from the present construction.

Kelly U.S. Pat. No. 2,648,946 discloses another hay rake assembly formed from a plurality of substantially identical sections that can be assembled on a supporting shaft to produce a rake of a width equal to the combined widths of any number of sections. Again, the rake tine assembly is raised and lowered through the media of a substantially complicated linkage mechanism.

U.S. Pat. Nos. 3,438,183 and 3,713,284 disclose still other raking mechanisms which are characterized by complicated linkage assemblies for manually raising and lowering a rake tine assembly or other implements, none of which disclose the principal constructional features of the present device.

Although the various mechanisms disclosed in the above-identified patents have attempted to improve and increase the efficiency, versatility, and mobility of various types of lawn rake assemblies and other implements, many disadvantages and shortcomings still exist. For example, the prior art constructions are relatively large, difficult and cumbersome to maneuver behind a towing vehicle and most known constructions provide no means whatsoever for adequately retaining the gathered debris within the boundaries of the rake tine area but allow such debris to easily and readily escape laterally therefrom as the debris accumulates therein. This is a typical problem associated with conventional raking mechanisms wherein debris is allowed to collect lengthwise along the entire rake assembly in a somewhat rectangular pattern such that the normal operation of the rake assembly during movement over a raking surface promotes lateral loss of such debris from each end portion thereof. This problem is accented during turns and other maneuvering of the rake assembly behind a towing vehicle and considerably reduces the overall efficiency of such devices. In addition, most prior art constructions utilize a substantially complicated conventional linkage mechanism for actuating movement of the rake tine assembly between a lowered raking position and a raised dumping position and most constructions do not provide easily accessible means which can be operated from the seat of a riding mower or other suitable towing vehicle for raising and lowering the rake tine assembly with respect to the ground. Additionally, most known raking mechanisms employ a single tine assembly of conventional width which cover a relatively small raking area when compared to the width of the present invention, thus suggesting additional time in accomplishing the raking task, especially where the raking of a large area is involved. For these and other reasons, the known constructions have not been entirely satisfactory and have enjoyed limited usefulness.

The present device overcomes these and other shortcomings and disadvantages of known prior art devices including the raking mechanisms disclosed in the named patents, and teaches the construction and operation of a relatively simple construction both structually and operationally which is also relatively inexpensive to make, use, repair and replace. The present device greatly facilitates and effectively decreases the overall time required for a raking operation and is especially advantageous for use in raking large areas of grass clippings, accumulated leaves, and/or other lawn related debris. In addition, the present device provides means for more efficiently gathering and retaining associated lawn debris within the confines of the rake tine assembly and enables the user thereof to deliver and dump a greater amount of accumulated debris as compared to known conventional raking mechanisms in convenient piles throughout the raking area or in one specific location for further facilitating the removal and disposal thereof. Additionally, the present device is lightweight, easy to attach to and detach from a conventional riding mower or other suitable vehicle, and can be easily and conveniently operated and manipulated by responsible users of varying ages.

SUMMARY OF THE INVENTION

The present lawn rake attachment includes a wheel frame supporting assembly preferably U-shaped in configuration having means thereon for coupling to a conventional riding mower or other suitable vehicle so that the present device can be easily and conveniently towed during a raking operation. A tine carrying cross-bar member is pivotally mounted above the wheel frame assembly and is supported thereat between two spaced substantially parallel support members which are angularly related to the wheel frame assembly and rigidly attached thereto in opposed relationship to each other. A rake tine assembly is securely attached to the pivotal tine carrying cross-bar member for rotational movement therewith and is held in a ground engaging operative position by means of a tension spring member which constantly urges the tine assembly downwardly into its fully lowered active position. A handle member for pivotally operating the rake tine assembly is securely attached to the pivotal tine carrying cross-bar member and extends forwardly therefrom towards the towing vehicle. The handle member is positioned such that it is easily and readily accessible from the seat of the towing vehicle without requiring the operator thereof to completely stop the raking process and/or physically dismount the towing vehicle in order to deliver and dump the accumulated debris gathered by the present device. The rake tine assembly may be pivotally rotated by the operator from its operative raking position by the exertion of a downward manual force on the handle member thereby causing the entire rake assembly to rotate to its elevated position for delivering and dumping the accumulated clippings and other debris therefrom. Once the contents of the rake assembly have been removed and dumped, the tines may be again lowered into their active raking position by simply releasing the downward force exerted on the handle member and the raking process may be continued.

One embodiment of the rake tine assembly includes three substantially identical tine subassemblies or sections positioned in close abutting relationship adjacent to each other and adaptable to overlap each other at each respective end portion thereof so as to form a continuous rake assembly of predetermined width. This particular overlapping arrangement is important because it not only produces a rake assembly of substantially greater width as compared to known conventional lawn raking mechanism, but it also enables the user thereof to effectively vary the overall width of the rake assembly depending upon the total number of tine sections incorporated therein. Based upon the particular needs of the user, the overall width of the rake assembly can be easily manufactured and constructed to include the required number of individual tine sections so as to conform to a particular width desirable for a raking operation associated with a particular acreage, or any other specialized use and/or application of the present device. This arrangement also greatly facilitates and effectively improves the efficiency of both gathering and retaining lawn clippings and other accumulated debris therein.

Another embodiment of the present rake tine assembly includes a rake assembly consisting of three substantially identical tine sections wherein the center tine section is positioned so as to trail the two remaining tine sections located on each side thereof and is adaptable to overlap said adjacent tine sections at each end portion thereof. This trailing feature of the center tine section is likewise advantageous because it inherently allows a funneling effect to develop whereby the debris accumulated during a raking process is effectively moved or guided towards the center tine section thereby tending to focus and collect the gathered debris centrally within the rake assembly and effectively reducing the lateral loss of debris from each outermost end tine portion thereof, a problem commonly associated with conventional lawn rake assemblies. This specific arrangement of the rake tine sections also enables a greater amount of accumulated debris to be gathered therein as compared to conventional rake assemblies and allows such debris to be collected in a somewhat semi-circular pattern to facilitate both the maneuvering and dumping thereof.

A still further embodiment of the present rake tine assembly includes a three tine section assembly having the center tine section disposed in an overlapping trailing position relative to the two end tine sections wherein said end tine sections are angularly disposed relative to the trailing center tine section so as to form a converging funnel-shaped tine assembly whereby all debris accumulated therein is more effectively directed towards the center trailing tine section to further prevent lateral loss of debris therefrom. This more pronounced funneling effect achieved by this specific angular relationship between the respective tine sections further enhances the efficiency and maneuverability of the present device, further enables a greater amount of accumulated debris to be collected therein, and substantially eliminates the lateral loss of debris associated with other known raking devices.

It is also anticipated that optional tine sections may be easily and conveniently attached to the outermost end tine sections of certain embodiments of the rake tine assembly, which optional sections are configured to extend forwardly as well as outwardly therefrom so as to effectively increase the ability of the present device to more efficiently gather and retain debris accumulated therein. These optional tine sections may be attached to the rake assembly by any suitable connecting means. It should also be noted that all embodiments of the present rake tine assembly may include a plurality of substantially identical overlapping tine sections so as to form rake assemblies of variable widths. In addition, it is particularly important to the present invention that the individual tine subassemblies or sections overlap each other at their respective end portions so as to provide a convenient means for raking a relatively large acreage, which raking means effectively improves the overall efficiency of the present rake attachment, increases productivity, decreases manual labor, and effectively reduces the overall time required for the raking operation.

It is therefore a principal object of the present invention to provide a simple, lightweight mobile lawn rake attachment utilizing a rake tine assembly conveniently mounted for pivotal movement and having a plurality of overlapping tine subassemblies which provides a convenient means of raking relatively large areas using the powered means of a riding mower or other suitable towing vehicle as a motive source.

Another object is to provide a lawn rake attachment wherein the overall width of the rake tine assembly can be varied depending upon the particular use and/or application of the present device and can be easily constructed to include a specific number of individual tine subassemblies so as to conform to the particular width desired.

Another object is to provide a lawn rake attachment including a rake assembly having three substantially identical tine sections wherein the center tine section may be disposed aft of the two remaining end tine sections in an overlapping trailing position thereto so as to effectively enhance the ability of the present device to more efficiently gather and retain accumulated debris therein.

Another object is to provide a lawn rake attachment which substantially reduces the lateral loss of accumulated debris commonly associated with conventional rake assemblies.

Another object is to provide a lawn rake attachment which is durable and includes means thereon for easily and conveniently coupling to a conventional lawn tractor or other suitable vehicle for towing.

Another object is to provide a lawn rake attachment which utilizes a simple linkage mechanism readily accessible and manually operable from the seat of the towing vehicle for pivotally operating the rake tine assembly.

Another object is to provide a lawn rake attachment which substantially increases productivity, decreases manual labor, and effectively reduces the overall time required for a raking operation.

Another object is to provide a lawn rake attachment from which the accumulated lawn clippings and other debris may be easily removed and deposited at a desired location.

Another object is to provide a relatively inexpensive construction which is lightweight, durable and requires relatively little maintenance.

Another object is to provide a lawn rake construction which is both relatively simple and non-hazardous to use and operate.

Another object is to provide a relatively simple lawn rake construction which is highly maneuverable and can be easily and economically produced for both commerical and non-commercial use.

These and other objects and advantages of the present invention will become apparent to those skilled in the art after considering the following detailed specification in conjunction with the accompanying drawings.

DETAILED DESCRIPTION

Figure 1:
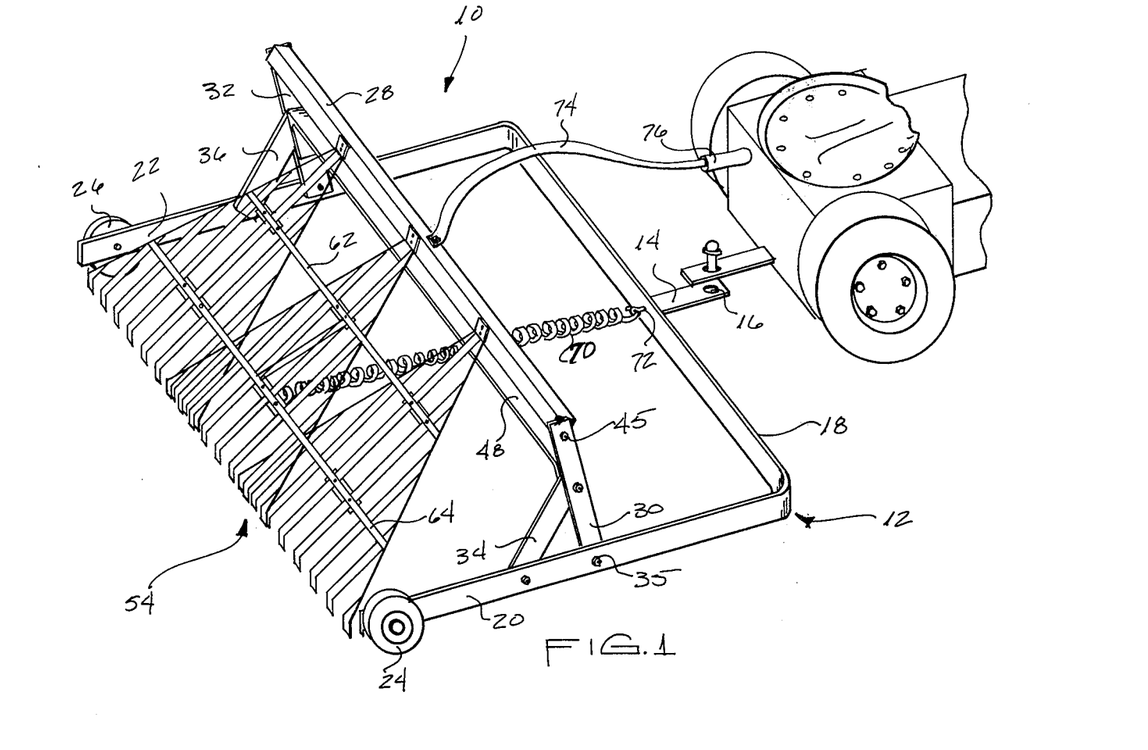
FIG. 1 is a perspective view of a mobile lawn rake attachment constructed according to the teachings of the present invention in operative position for attachment to a conventional lawn tractor.

Referring to the drawings more particularly by reference numbers and wherein like numerals refer to like parts, number 10 in FIG. 1 refers generally to a lawn rake attachment constructed according to the teachings of the present invention. The lawn rake device 10 includes a wheel frame supporting assembly 12 having a forwardly extending member 14 with means 16 located thereon for coupling the present device to a conventional riding lawn mower, garden tractor or other suitable vehicle which can be used for towing. Coupling means 16 will normally include an apertured member such as member 14 but may include any other conventional coupling means for operatively attaching the present device to a towing vehicle. Although a wide variety of varying structural configurations of the wheel frame assembly may be utilized in the practice of the present invention, in its preferred embodiment, support frame assembly 12 is substantially U-shaped in configuration having a structural cross-member 18 and side frame members 20 and 22 extending rearwardly therefrom. Supporting wheel members 24 and 26 are attached to the rearward end portions of side frame members 20 and 22 as shown in FIG. 1 and are mounted for rotation thereon by any suitable conventional means. It is important to the present invention that wheel members 24 and 26 be mounted on the outside portion of side frame members 20 and 22 and that no axle or other conventional rotating means extend inwardly therefrom between said members so as not to interfere with the operation of the rake tine assembly and/or the raking process. This wheel mounting arrangement is likewise advantageous in expediting the construction of units having varying rake tine assembly widths as will be more fully explained hereinafter. In addition, it is also anticipated that the supporting wheel members may likewise include anti-friction bearings, conventional spindle assemblies, or other suitable means for enhancing the towing of the subject device. It should be noted that the entire wheel frame assembly 12 can be easily and conveniently molded into a unitary structure from conventional steel moldings or it can be easily fabricated from tubular steel or steel angle sections which are dimensioned and spot welded to form a unitary structural configuration.

A tine carrying cross-bar member 28, preferably of a substantially hollow construction, is disposed above the frame support assembly 12 and is pivotally mounted at each end portion thereof to a pair of spaced substantially parallel support members 30 and 32 having apertures 33 (FIG. 2) therein for rigidly attaching said members in opposed relationship to each other to side frame members 20 and 22 by any suitable fastening means such as by threaded members similar to members 35. Support members 30 and 32 are angularly related to side frame members 20 and 22 and extend rearwardly therefrom as shown in FIG. 1. A pair of angularly disposed flange members 34 and 36 having their opposite end portions rigidly secured to side frame members 20 and 22 and opposed support members 30 and 32 respectively are utilized in order to provide additional stability and rigidity to both members 30 and 32 and to the entire rake tine supporting structure. Flange members 34 and 36 may likewise be attached in any conventional manner such as by threaded members similar to members 35, rivets, pins, removable or rotatable brackets, and any other conventional fastening means.

Any well known suitable means for pivotally mounting the tine carrying cross-bar member 28 may be utilized in the practice of this invention. Typical of such pivot means is a pair of pivot pin members 38 (FIG. 2) each of which includes a spherical head portion 40 for permitting rotational movement thereon and a threaded end portion 42 for holding and securing members 38 to the upper end portions of support members 30 and 32. Threaded portions 42 of pin members 38 extend through apertures 44 on members 30 and 32 and are rigidly attached thereto by conventional fastening means such as member 45 (FIG. 1). The spherical head portions 40 of pivot members 38 are cooperatively engageable with each end portion of the tine carrying cross-bar member 28 and functionally support and hold said member in proper elevated position above the wheel frame assembly 12 and allow said member to freely rotate thereabout.

Figure 2:
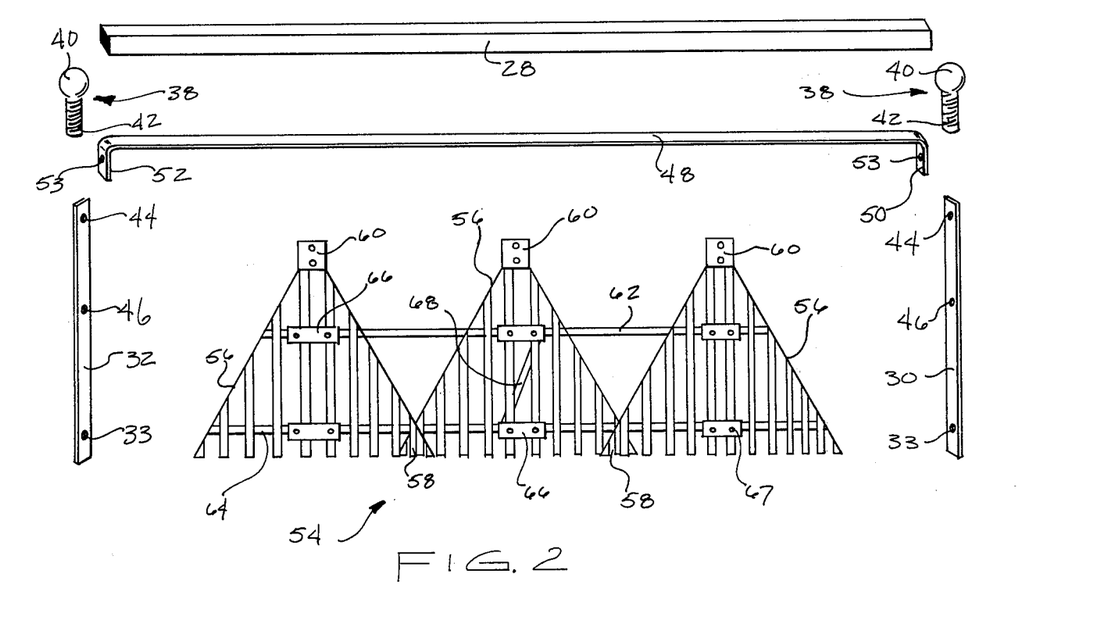
FIG. 2 is an exploded elevational view showing the rake tine assembly and supporting structure in detached assembly.

An additional cross member 48 including downwardly extending flange portions 50 and 52 at each end portion thereof each of which having an aperture 53 extending therethrough (FIGS. 1 and 2) is disposed in substantially parallel relationship below the tine carrying cross-bar member 28 and is rigidly secured to support members 30 and 32 by any suitable fastening means. Typical of such fastening means are threaded members 35 which may be extended through apertures 46 on members 30 and 32 (FIG. 2) and apertures 53 on flange portions 50 and 52 when said apertures are aligned and placed in close abutting relationship with each other. It should also be noted that member 48 and angularly disposed flange members 34 and 36 may be conveniently attached to support members 30 and 32 by utilizing apertures 46 for simultaneously connecting said members thereto as shown in FIGS. 1 and 2. The spaced parallel cross member 48 is likewise utilized as a means for providing additional stability and rigidity to both support members 30 and 32 and to the entire rake tine supporting structure. In addition, cross member 48 also functions as a means for drawing opposed support members 30 and 32 inwardly towards each other so as to prevent any outward movement relative thereto and aids in further maintaining the tine carrying cross-bar member 28 in cooperative engagement with the spherical head portions 40 of pin members 38 thereby securely holding said pivotal member 28 in proper position thereon so as to prevent disengagement therefrom.

A rake tine assembly 54 as shown in FIGS. 1 and 2 includes a plurality of substantially identical tine subassemblies or sections 56 which are adaptable to overlap each other at each end portion thereof as shown at 58 so as to provide a continuous rake assembly whereby the overall width of the rake tine assembly 54 can be effectively varied depending upon the total number of individual tine sections utilized. Based upon the particular needs of the user, the overall width of the rake assembly can be easily and conveniently manufactured to include the required number of individual tine sections 56 so as to conform to any particular width desired. It should be noted that since no axle or other conventional rotating means for mounting wheel members 24 and 26 extends inwardly between side frame members 20 and 22, manufacturing of units having varying rake tine assembly widths is considerably expedited since only the overall length of members 18, 28 and 48 need be varied in order to produce a rake assembly having the desired number of individual tine sections necessary to conform to a specified width. In the embodiment of the present invention as shown in FIGS. 1 and 2, the rake tine assembly 54 includes three individual tine sections 56 having an overall width of approximately 7 feet, 6 inches. The center tine section is positioned in close abutting relationship aft of and adjacent to the two remaining tine sections located on each side thereof and is adaptable to overlap said remaining tine sections as shown at 58. The individual tine sections 56 may be constructed from a spring steel wire or other suitable material clustered onto a common mounting plate 60 each of which may be separately attached to the pivotal tine carrying cross-bar member 28 by any suitable attaching means. One such method of attachment would include bolting the mounting plates 60 to the pivotal member 28 which would likewise permit easy removal of the individual tine sections for straightening, repair and/or replacement, as required. A pair of spaced apart parallel tine support members 62 and 64 are also positioned to extend across the entire width of the rake tine assembly 54 on one side thereof as best shown in FIG. 1 and are attached to the individual tine sections by use of a plurality of bracket plate members 66 respectively positioned on the opposite side thereof (FIG. 2) so as to secure and hold the individual tine sections 56 in proper position and alignment relative to each other. The tine support members 62 and 64 in conjunction with the bracket plate members 66 securely sandwich together the individual tine sections and are rigidly attached thereto by threaded members 67 or any other suitable attaching means. An additional support member 68 is likewise attached at each end portion thereof to the tine support members 62 and 64 respectively so as to provide additional stability and rigidity to the overall rake tine assembly and prevent relative movement therebetween.

The primary means for holding and maintaining the rake tine assembly 54 in its ground engaging operative position is utilization of a tension spring member 70 as shown in FIG. 1. Spring member 70 is secured at one end portion thereof to the structural cross member 18 of wheel frame assembly 12 by any suitable connecting means such as an eye bolt member 72 centrally located thereon and is likewise securely attached at its opposite end portion to the rake tine assembly 54 by a similar member 72 or any suitable connecting means. Spring member 70 constantly urges the tine assembly downwardly into its active fully lowered raking position and may be easily and conveniently attached to either the central portion of support member 64 or the center most bracket plate member 66 located thereon. It should be noted that materials of varying weight may also be utilized in the construction of support members 62, 64 and 66 so as to provide additional weight to the rake tine assembly thereby creating gravity forces which may likewise help to urge the entire rake assembly 54 downwardly into its ground engaging raking position. In addition, it is likewise anticipated that a plurality of spring members 70 may be utilized in the practice of this invention so long as the downward force exerted on the rake tine assembly urging said assembly into its operative raking position is evenly distributed thereover so as to produce a uniform continuous raking action in response to the normal operation of the rake assembly during movement over a lawn, field, or other raking surface. Additionally, it is also anticipated that the entire rake tine assembly may be made adjustable so as to vary the angle at which the tines on each individual section 56 engage the raking surface.

Means for pivotally operating the rake tine assembly 54 includes a handle member 74 as shown in FIG. 1 which is attached to the pivotal tine carrying cross-bar member 28 and extends forwardly therefrom towards the seat of the towing vehicle. The forward end portion of handle member 74 is fitted with a comfortable grip member 76 such as a conventional rubber hand grip commonly used on bicycles and the like or any other suitable member so as to facilitate the grasping of such handle member by the vehicle operator. The handle member 74 is positioned such that it is easily and readily accessible from the seat of the towing vehicle so as not to require the operator thereof to interrupt and/or stop the raking process or physically dismount the towing vehicle in order to position the rake tine assembly for the purpose of delivering and dumping the assorted materials accumulated therein. The mere exertion of a downward manual force on handle member 74 pivotally rotates the rake tine assembly 54 against the tension spring member 70 and allows the operator thereof to easily and conveniently raise the tine assembly from its active raking position to its elevated dumping position angularly related thereto. Once the accumulated debris has been dumped, the vehicle operator need only release the downward manual force exerted on handle member 74 and the tine assembly, through the urging force exerted by spring member 70, will again be lowered to its normal operative position so that the raking process may be continued. It should be noted that the present device enables the vehicle operator to deliver and dump the accumulated lawn clippings or other debris in convenient piles throughout the raking area or in one specific location thereby further facilitating the disposal thereof.

Figure 3:
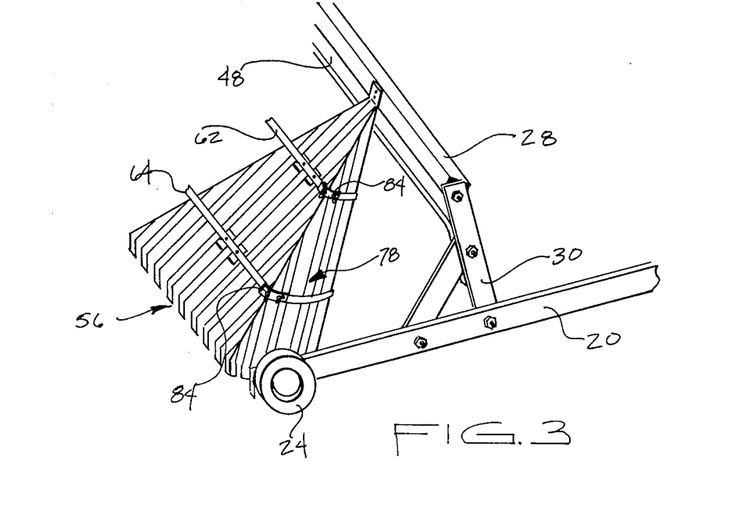
FIG. 3 is a partial perspective view of the present device showing an optional tine section operatively attached to the outermost tine section of the rake assembly for more efficiently gathering and retaining lawn clippings and other accumulated debris.
Figure 4:
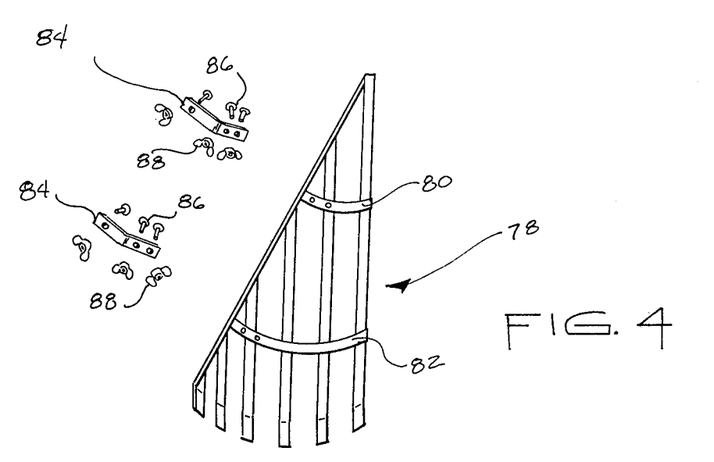
FIG. 4 is a perspective view of the optional tine section shown in FIG. 3 including means for attaching the same to the outermost tine sections of the rake assembly.

FIGS. 3 and 4 show an optional tine section 78 which may be easily and conveniently attached by any suitable connecting means to the outermost end tine section 56 on both opposite sides of the rake assembly 54 so as to more effectively increase the ability of the present device to efficiently gather and retain lawn clippings and other associated debris accumulated therein. The tine section 78 includes a pair of spaced parallel stabilizing cross members 80 and 82 which not only add strength and rigidity to the overall structure of the member itself but likewise function as a means for connecting said member to both outermost end tine sections of the rake assembly. One method of effectively attaching member 78 to both end tine sections 56 is utilization of a pair of angled bracket members 84 as best shown in FIG. 4 wherein one end portion of each of said members 84 is rigidly secured to the respective end portions of cross members 80 and 82 on member 78 and the other end portion of each of said members is rigidly secured to the respective end portions of cross members 62 and 64 on end tine sections 56. It should be noted that bracket members 84 may be conveniently attached to their respective members by any suitable connecting means such as by bolts, rivets, and other fastening members which may extend through apertures on each of said members respectively for rigidly attaching said members to one another. In addition, other attaching means such as U-shaped locking clips and other locking clamps may also be utilized. However, it is preferred that threaded members such as members 86 be used in conjunction with wing nut members 88 so as to provide an easy and convenient means for quickly attaching and removing the optional tine section members 78 as desired. In addition, the shape and contour of members 78 is such that when attached to the outermost end portions of the rake tine assembly 54, members 78 extend forwardly as well as outwardly therefrom so as to increase the ability of the present device to gather and retain the accumulated debris therein thereby preventing such debris from escaping and spilling over side frame members 20 and 22 respectively. Although it is anticipated that members 78 will be utilized primarily as optional attachments which can be easily attached and removed as desired, said members may likewise be permanently attached to the rake tine assembly 54, such as by welding, for continuous use therewith. The addition of tine section members 78 not only improves the efficiency of the present device and substantially reduces the lateral loss of debris therefrom but also enables a greater amount of accumulated debris to be collected therein.

Figure 5:
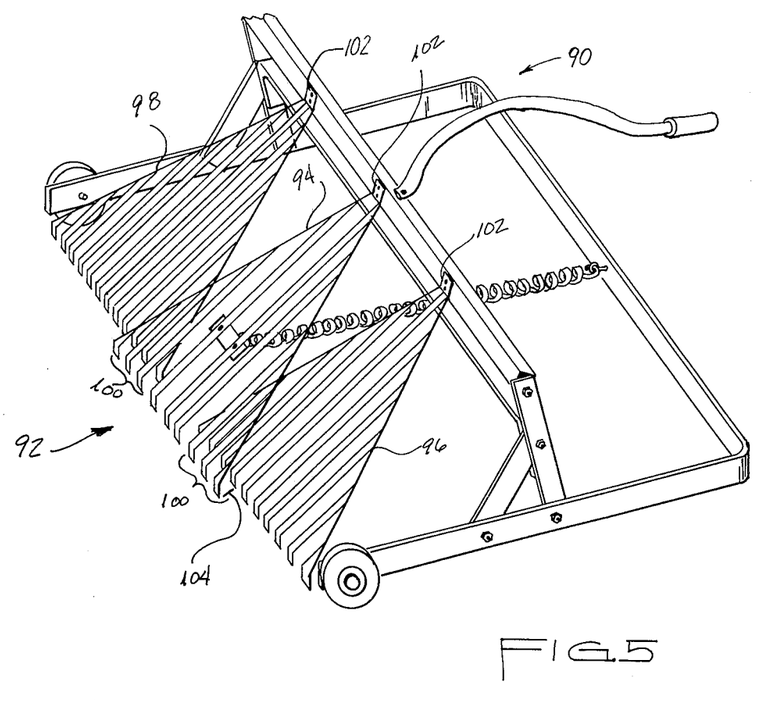
FIG. 5 is a perspective view of the present device showing a modified embodiment of the rake tine assembly wherein the center tine section is disposed aft of the two remaining tine sections located on each side thereof and is adaptable to overlap said adjacent tine sections at each end portion thereof.

FIG. 5 discloses another embodiment 90 of the present lawn rake construction showing a modified rake tine assembly 92 having three substantially identical tine sections similar to rake assembly 54 wherein the center tine section 94 is positioned so as to trail the two remaining tine sections 96 and 98 located on each adjacent side thereof and is adaptable to overlap adjacent tine sections 96 and 98 respectively at each end portion thereof as shown at 100. The individual tine sections 94, 96 and 98 are constructed in similar fashion to tine sections 56 (FIGS. 1 and 2) and likewise include mounting plates 102 similar to mounting plates 60 (FIG. 2) each of which may be separately attached to a pivotal tine carrying cross-bar member similar to member 28 (FIGS. 1 and 2) as hereinbefore disclosed with reference to rake assembly 54. A tension spring member is likewise utilized for constantly urging the rake tine assembly 92 downwardly into its ground engaging operative position, which spring member is substantially similar in every respect including the manner of attachment, overall structure, and operation to member 70 as shown in FIG. 1. In response to the movement of the rake assembly 92 across a raking surface, an inherent funneling effect is produced wherein debris is allowed to collect and spill over from each inward end portion of end tine sections 96 and 98 respectively and such debris is automatically guided towards the trailing center tine section 92 for retention therein. This funneling effect produced by the overlapping trailing feature of the center tine section 94 is advantageous to the improved performance and efficiency of the present construction as compared to conventional raking mechanisms and substantially increases the ability of the present device to more effectively and efficiently gather and retain the accumulated debris within the central portion of the rake assembly 92. This specific arrangement of rake tine sections 94, 96 and 98 substantially eliminates the typical problem associated with conventional lawn rake assemblies wherein no means are provided for adequately retaining the gathered debris within the rake assembly and accumulated debris is commonly allowed to escape laterally therefrom. In addition, it should be noted that the exact positioning of the center tine section 94 aft of the two end tine sections 96 and 98 may vary to some extent so long as the total distance or space 104 existing therebetween is not so great as to allow the accumulated debris to escape sidewardly therefrom. During normal operations of the rake assembly 92 over a raking surface, the space 104 should be so dimensioned such that debris will easily collect and lodge therebetween thereby substantially reducing and/or preventing the same from escaping therethrough. If the space 104 is made sufficiently large, some lateral lose of debris therethrough can be anticipated. It is also contemplated that the overall contour of center tine section 94 may be fashioned in a somewhat semi-circular configuration or other curved or rounded form such that both end portions thereof may extend forward towards and even meet in close abutting relationship with the inward end portions of end tine sections 96 and 98 respectively so as to further reduce and/or eliminate the space or opening 104 existing therebetween and enable a greater amount of debris to be more readily collected and retained therein.

It is likewise important to note that the inherent funneling effect created by the specific arrangement of the tine sections in the rake assembly 92 also allows the debris to be accumulated in a somewhat semi-circular pattern predominantly within the central portion of the rake tine assembly in contrast to the linear pattern associated with conventional raking assemblies wherein debris is accumulated lengthwise along the entire length of the rake tine assembly. This inherent collection of debris in a semi-circular fashion tends to retain such debris within the rake assembly throughout the entire raking process and substantially reduces the lateral loss therefrom. This is especially true during turns and other manuevering of the present device behind a towing vehicle where the potential for such lateral loss of accumulated debris is substantially increased.

In addition, it is also anticipated that a plurality of substantially identical overlapping tine sections may likewise be utilized in the practice of the embodiment 90 similar to embodiment 10 (FIGS. 1 and 2) in order to vary the overall width of the rake tine assembly 92 so long as the total number of individual tine sections incorporated therein equals an odd number of such sections wherein each alternating even numbered section therein is disposed aft of the two adjacent tine sections located on each side thereof in an overlapping trailing position similar to tine section 94. Additionally, optional tine section 78 as shown in FIGS. 3 and 4 may likewise be easily and conveniently attached by any suitable connecting means to end tine sections 96 and 98 respectively so as to further increase the ability of the rake assembly 92 to effectively and efficiently gather and retain lawn clippings and other associated debris therein. The addition of tine section members 78 to the embodiment of rake tine assembly 92 not only further improves the overall efficiency of the present device but likewise enables a still greater amount of accumulated debris to be collected therein.

Figure 6:
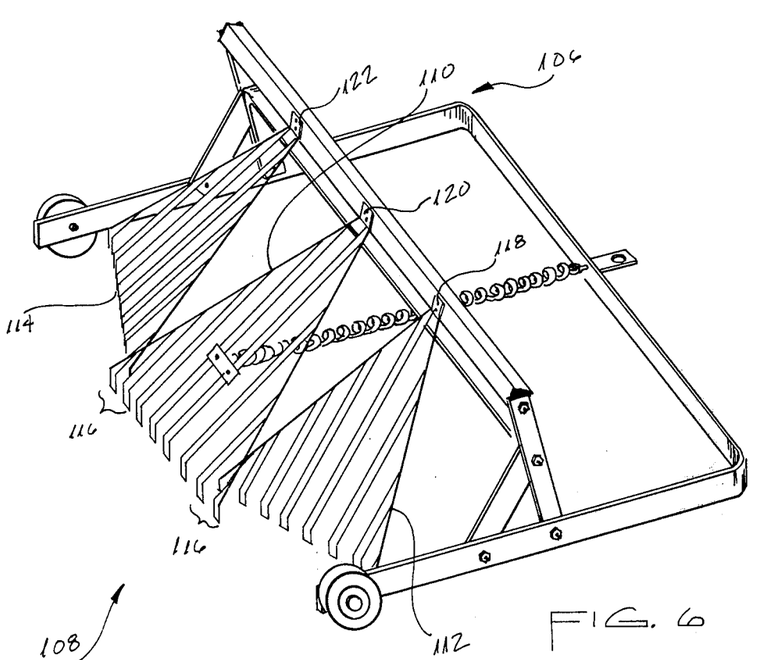
FIG. 6 is another perspective view of the present device showing a still further embodiment of the rake tine assembly similar to the embodiment shown in FIG. 5 wherein the two end tine sections are angularly disposed relative to the center tine section.

FIG. 6 discloses a still further embodiment 106 of the present lawn rake construction showing another modified rake tine assembly 108, which rake assembly is somewhat similar in overall structure and operation to the rake tine assembly 92 as shown in FIG. 5. The modified rake tine assembly 108 likewise includes three substantially identical tine sections having the center tine section 110 disposed in an overlapping trailing position relative to the two end tine sections 112 and 114 respectively as shown at 116 wherein said end tine sections 112 and 114 are angularly disposed relative to the center tine section 110 and extend forwardly as well as outwardly therefrom so as to form a converging funnel-shaped tine assembly. This angular displacement of end tine sections 112 and 114 produces a more pronounced funneling effect as compared to the embodiment of rake assembly 92 (FIG. 5) whereby debris is even more effectively directed towards the center tine section 116 so as to still further increase the ability of the present device to gather and retain associated lawn debris within the rake assembly and prevent lateral lose therefrom. Individual tine sections 110, 112 and 114 are likewise substantially similar to tine sections 56 (FIGS. 1 and 2) and likewise include mounting plates 118, 120 and 122 respectively, each of which may be similarly attached by any suitable connecting means to a tine carrying cross-bar member similar to member 28 for rotational movement therewith. It should be noted that mounting plates 118 and 122 may likewise include pivot and locking means whereby end tine sections 112 and 114 may be manually positioned and adjusted by the user thereof to achieve any desired angular relationship between said members and the center tine section 116 including the specific arrangement disclosed in embodiment 92 (FIG. 5). A tension spring member similar in overall structure and operation to spring member 70 (FIG. 1) is similarly utilized in embodiment 106 as previously explained in the practice of rake assemblies 10 and 90. The converging feature of tine sections 112 and 114 further increases the overall efficiency and maneuverability of the present device, further enables a still greater amount of accumulated debris to be collected therein, and substantially eliminates the lateral loss of debris commonly associated with conventional rake assemblies. In addition, it is also anticipated that a plurality of substantially identical overlapping tine sections may likewise be utilized in the practice of this embodiment similar to the arrangement specified in the practice of embodiment 92 wherein the outermost end tine sections such as tine sections 112 and 114 are angularly disposed relative to their respective adjacent tine sections. Additionally, it should be noted that both embodiments 92 and 108 of the rake tine assembly further enable the vehicle operator to more easily and effectively maneuver the present device throughout the raking process without substantial loss of debris therefrom and likewise enable the operator to more easily and conveniently remove and deposit the accumulated debris at any desired location thereby further facilitating the entire raking process.

Although the present invention has been described as being constructed primarily from conventional steel moldings, it is recognized that any well known materials of construction may likewise be utilized in fabricating the apparatus of the present device so long as they afford rigidity to the overall structure at a comparatively low weight. Generally, because of the ready availability at a low cost, the component parts of the present device may be constructed from conventional metal moldings and various alloys to add strength, durability and corrosion resistant qualities thereto. Any well known sheet construction material may be used in the practice of this invention. For example, sheet steel, aluminum, and other known metals may be used in fabricating parts in order to reduce the overall weight. Additionally, stainless steel, bronze and rigid copper alloys would likewise work very well in the construction of this invention but may be more expensive. Also iron alloys may be utilized in the practice of this invention but would tend to rust and require frequent cleaning. Likewise, brass sheeting may be used in the practice of this invention but would likewise be quite expensive.

It is also anticipated that certain plastic materials such as polycarbonates, reinforced nylon, polyesters reinforced with fibers such as glass fibers, polyolefins such as polypropylene, and many other types of rigid plastic materials may likewise be utilized in fabricating many of the component parts for the apparatus of this invention. Such plastic members could be easily injection molded and assembled in any conventional manner.

It is important to note that the overall width of each embodiment of the rake tine assembly is subject to wide variations and the total number of individual tine subassemblies or sections incorporated therein will depend on the particular utilization to be made of the present device. Conceivably, large commercial units may be utilized in the practice of this invention whenever it is anticipated that medium to large land areas would require raking operations but, more likely, the primary utilization of the present device will be as an accessory attachment for homeowners and other users who utilize conventional riding lawn mowers, small garden tractors, and other similar towing vehicles in the ordinary maintenance of their lawn or other grassy areas.

Thus there has been shown and described a novel lawn rake attachment for use in conjunction with conventional riding mowers and other similar towing vehicles for performing a wide variety of varying raking operations, which lawn rake construction fulfills all of the objects and advantages sought therefor. Many changes, modifications, variations and other uses and applications of the present lawn rake construction will, however, become apparent to those skilled in the art after considering this specification and the accompanying drawings. All such changes, modifications, variations, and other uses and applications which do not depart from the spirit and scope of the invention are deemed to be covered by the invention which is limited only by the claims which follow.

What is claimed is:

1. A detachable lawn rake device advantageous for use with conventional riding mowers and other similar towing vehicles for gathering and removing lawn clippings, accumulated leaves and other associated lawn debris, said device comprising a wheel frame assembly including a cross frame member having means thereon for coupling to a conventional towing vehicle and side frame members extending rearwardly therefrom, said wheel frame assembly including supporting wheel members mounted on the outside portion of each of said side frame members for rotation thereon, a tine carrying cross-bar member positioned above said wheel frame assembly and supported thereat between a pair of spaced opposed support members rigidly attached to said wheel frame assembly and extending upwardly therefrom, means for pivotally connecting said tine carrying cross-bar member to said pair of spaced opposed support members, a movable rake tine assembly mounted to said pivotal tine carrying cross-bar member for rotational movement therewith between a ground engaging active raking position and an elevated dumping position angularly related thereto, said rake tine assembly including three substantially similar tine sections positioned adjacent to each other and having the center section thereof disposed aft of the two remaining end tine sections located on each side thereof in an overlapping trailing position relative thereto, said center tine section being adaptable to overlap said end tine sections at each end portion thereof, each of said three tine sections including means for separately rigidly attaching said tine sections to said pivotal tine carrying cross-bar member, biasing means for constantly urging said rake tine assembly downwardly into its operative raking position, and readily accessible means manually operable from the seat of the towing vehicle for pivotally raising and lowering the rake tine assembly with respect to a raking surface.

2. The detachable lawn rake device defined in claim 1 wherein said biasing means for constantly urging the rake tine assembly downwardly into its ground engaging raking position includes at least one spring member having one end portion thereof attached to the cross frame member of said wheel frame assembly and its opposite end portion attached to said rake tine assembly.

3. The detachable lawn rake device defined in claim 1 wherein said means pivotally connecting said tine carrying cross-bar member to said pair of spaced opposed support members includes pivot means cooperatively engageable with each end portion of said tine carrying cross-bar member and each of said pair of spaced opposed support members respectively for pivotally rotating said tine carrying cross-bar member above said wheel frame assembly.

4. The detachable lawn rake device defined in claim 1 wherein an additional tine section member is cooperatively engageable with the outermost end tine section of both opposite sides of the rake tine assembly, said additional tine section member extending forwardly as well as outwardly from each of said outermost end tine sections when attached thereto to increase the ability of said device to gather and retain accumulated debris therein.

* * * * *